United States Patent [19]

Gazsi

[11] Patent Number: 5,500,613
[45] Date of Patent: Mar. 19, 1996

[54] METHOD FOR PRODUCING A DIGITAL SINE WAVE SIGNAL WITH A GIVEN SAMPLING RATE, AND CIRCUIT CONFIGURATION FOR CARRYING OUT THE METHOD

[75] Inventor: Lajos Gazsi, Düsseldorf, Germany

[73] Assignee: Siemens Aktiengesellschaft, Munich, Germany

[21] Appl. No.: 392,074

[22] Filed: Feb. 22, 1995

[30] Foreign Application Priority Data

Mar. 11, 1994 [DE] Germany .......................... 44 08 323.8

[51] Int. Cl.$^6$ ..................................... H03K 5/08
[52] U.S. Cl. .................. 327/107; 327/129; 327/311
[58] Field of Search .......................... 327/107, 129, 327/311

[56] References Cited

U.S. PATENT DOCUMENTS

| | | | |
|---|---|---|---|
| 3,579,117 | 5/1971 | Norris et al. | 328/27 |
| 4,816,830 | 3/1989 | Cooper | 327/129 |
| 4,937,873 | 6/1990 | McAulay et al. | 381/51 |
| 4,943,926 | 7/1990 | Guzman-Edery et al. | 327/129 |

Primary Examiner—Margaret Rose Wambach
Attorney, Agent, or Firm—Herbert L. Lerner; Laurence A. Greenberg

[57] ABSTRACT

A method for generating a digital sine wave signal having a predetermined sampling rate includes generating a pulse train with an alternating or constant amplitude sign, at a sampling frequency having a predetermined sampling rate frequency divided by $2^n$. An envelope curve is generated. The sampling rate is doubled. The doubling of the sampling rate is repeated until generation of a desired sine wave signal in an unfiltered spectrum of the generated signal. Undesired frequency components are filtered out. The sampling rate is optionally re-increased by oversampling a previously generated signal. A circuit configuration for carrying out the method includes a unit for generating digital sampling values. A filter for generating an envelope curve is connected downstream of the unit for generating digital sampling values. Units for raising a sampling frequency are connected downstream of the filter for generating an envelope curve. A digital filter filters the generated digital sampling values.

8 Claims, 3 Drawing Sheets

METHOD FOR PRODUCING A DIGITAL SINE WAVE SIGNAL WITH A GIVEN SAMPLING RATE, AND CIRCUIT CONFIGURATION FOR CARRYING OUT THE METHOD

BACKGROUND OF THE INVENTION

1. Field of the Invention

The invention relates to a method for producing a digital sine wave signal with a given sampling rate, and a circuit configuration for carrying out the method.

A subscriber telephone line is supplied from a direct voltage source, which is connected in series with other signal voltage sources, for instance for speech signals in a phonic band, for wakeup signals, and for signals for indicating or displaying fees charged to the subscriber.

The connections of the lines are connected mutually parallel to both the speech circuit and the wakeup circuit of the subscriber telephone set, and are optionally connected, inside or outside the telephone set, to other devices, such as a display unit for progressively counting the charges as a telephone call is being made, which are constructed with the corresponding central station equipment. Switching equipment generates control signals that are normally called "charge or fee signals", and outputs them to the appropriate telephone line.

Such charge signals are understood to include charge pulses at a frequency of 12 kHz or 16 kHz, which are transmitted, with a duration of approximately 200 ms, during a call over a subscriber line in order to further increment the charge display by one unit. In order not to interfere with nearby frequency ranges, those charge pulses must be turned on and off softly. Transient response curves with a Gaussian function, for instance, are suitable for that purpose.

From German Published Non-Prosecuted Application DE 35 22 077 A1, corresponding to U.S. Pat. No. 4,720,852, and German Published Non-Prosecuted Application DE 35 16 007 A1, corresponding to U.S. Pat. No. 4,638,122, circuit configurations for signal generators for generating such charge signals by using analog circuitry are known.

SUMMARY OF THE INVENTION

It is accordingly an object of the invention to provide a method for generating a digital sine wave signal with a given sampling rate and a circuit configuration for carrying out the method, which overcome the hereinafore-mentioned disadvantages of the heretofore-known methods and devices of this general type and which meet the above-mentioned requirements.

With the foregoing and other objects in view there is provided, in accordance with the invention, a method for generating a digital sine wave signal having a predetermined sampling rate, which comprises generating a pulse train with an alternating or constant amplitude sign, at a sampling frequency having a predetermined sampling rate frequency divided by $2^n$; generating an envelope curve; doubling the sampling rate; repeating the doubling of the sampling rate until generation of a desired sine wave signal in an unfiltered spectrum of the generated signal; filtering out undesired frequency components; and optionally re-increasing the sampling rate by oversampling a previously generated signal.

In accordance with another mode of the invention, there is provided a method which comprises doubling the sampling rate by zero insertion, in the case of a signal train of alternating amplitude, or by doubling a sampling value otherwise.

In accordance with a further mode of the invention, there is provided a method which comprises generating the envelope curve with a filter.

With the objects of the invention in view, there is also provided a circuit configuration for generating a digital sine wave signal having a predetermined sampling rate, comprising a first unit for generating digital sampling values; a filter for generating an envelope curve, being connected downstream of the unit for generating digital sampling values; units for raising a sampling frequency, being connected downstream of the filter for generating an envelope curve; and a digital filter for filtering the generated digital sampling values.

In accordance with a concomitant feature of the invention, there is provided a last unit for doubling the sampling rate being combined into one unit with the digital filter, the digital filter being split into two signal paths, and the two signal paths being sampled in alternation by a reversing switch at twice the sampling frequency of the digital filter.

It is an advantage of the invention that the actual sine wave sampling values are generated at a low sampling rate, that the envelope curve is generated at this low sampling rate, and that then the actual digital sine wave to be generated is obtained by increasing the sampling rate and by filtering. This makes it unnecessary to perform expensive calculation of the various sampling rates and their turn-on and turn-off envelope curves for a given high sampling rate.

Other features which are considered as characteristic for the invention are set forth in the appended claims.

Although the invention is illustrated and described herein as embodied in a method for producing a digital sine wave signal with a given sampling rate, and a circuit configuration for carrying out the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
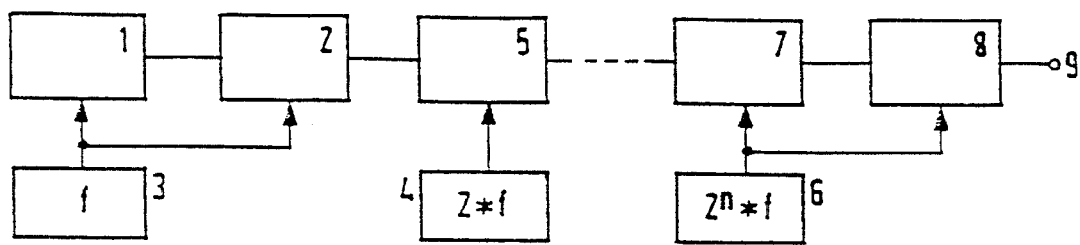
FIG. 1 is a block circuit diagram of a configuration according to the invention for carrying out the method.

Referring now to the figures of the drawing in detail and first, particularly, to FIG. 1 thereof, it is seen that reference numeral 1 indicates a first unit for generating pulse trains. This unit 1 generates sampling values at a frequency f, which is symbolized by a unit 3 for controlling a sampling rate. The unit 3 triggers the unit 1 and a unit 2. An output of the unit 1 is connected to an input of the unit 2. This unit 2 serves to generate an envelope curve. An output of the unit 2 is connected to an input of a unit 5. This unit 5 serves to raise the sampling rate and it is clocked from a unit 4 by a clock signal at twice the frequency. Dot-dashed lines suggest the possibility of providing further stages for further doubling of the sampling rate downstream. In FIG. 1, only one second unit 7 is shown, with an associated clock unit 6 and with a frequency of $2^n f$. The unit 7 is followed by a filter 8, which is fed by the same clock frequency as the unit 7. A digital sine wave signal can be picked up at the given sampling rate at a connection terminal 9, which is at an output of the unit 8.

Figure 2:
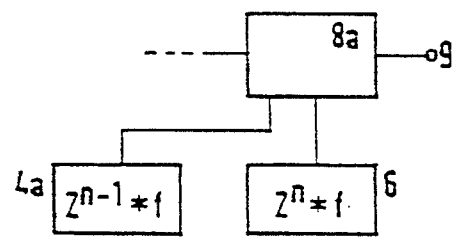
FIG. 2 is a block circuit diagram of part of an alternative embodiment of the configuration of the invention.

FIG. 2 alternatively shows part of a further embodiment. The units 1–5 in FIG. 2 are equivalent to those shown in FIG. 1. The units for doubling the sampling rate are followed in this case by a filter 8a, which is split into two signal paths at an output thereof. An embodiment of such a filter is described below with reference to FIGS. 5 and 8. The signals which are generated over the two signal paths are then sampled in alternation at twice the sampling rate, and thus a signal at twice the sampling rate is generated. The advantage of this configuration is that the filter still runs at a lower sampling rate and thus the spectrum of the signal to be processed is in a range that may be more favorable. The actual filter runs at half the desired sampling rate, which is furnished by a unit 4a. In the simplest case it can be equivalent to the unit 3 or 4. A final sampling rate is furnished by the unit 6 to the filter 8a. The filter 8a has a transfer function of $(\sin_x)/x$.

A generation of a 16 kHz charge pulse signal is described below in further detail as an example, in conjunction with FIGS. 1 and 2. For this purpose, the unit 1 is supplied with an 8 kHz clock signal by the clock supply unit 3. It is assumed that the desired predetermined sampling rate is 32 kHz, for example. In this case, the unit 5 need not be followed by any further unit for clock doubling. However, a filter 8a as in FIG. 2 is needed, in order to obtain a signal with the frequency of 16 kHz and the sampling rate of 32 kHz. To that end, the unit 1 generates sampling values with the same amplitude and with a frequency of 8 kHz. This signal is equivalent to a direct voltage sampled at 8 kHz. Through the use of the unit 2, which is constructed as a fourth order low-pass filter, for instance, an envelope curve is imposed upon the sampling values, thus generating a gentle transient response and attenuation process. As a result, a Gaussian curve-like transient response and attenuation envelope curve is generated. The doubling of the sampling rate then takes place in the following unit 5. To that end, in the present case, the sampling values are doubled. In other words, between each two former sampling values, one further sampling value is generated, having the amplitude of the first sampling value. The increase in the sampling rate could also be carried out by conventional zero insertion and filtration (transfer function $(\sin_x)/x$). A signal is then present at the output of the unit 5 that is unfiltered in the frequency range between 0 and 16 kHz and has one signal component at 0 kHz and one further signal component at 16 kHz, and so forth. The following filter 8 then filters out the undesired component, so that only the 16 kHz sine wave signal, having the desired envelope curve, remains. This signal is increased once again by oversampling to the desired sampling rate of 32 kHz and can be digitally picked up at the output 9 and delivered to the other appropriate circuit elements of the digital switching equipment.

A 12 kHz charge signal is generated as follows: As in the above example, it is assumed that the sampling rate is also 32 kHz, so that the layout of the configuration corresponds to that described for FIG. 1. The unit 5 is connected directly to the unit 7. The unit 1 then generates alternating sampling values with a sampling frequency of 8 kHz. In other words, sampling values of positive and negative amplitudes are generated in alternation. The unit 2 in this case is constructed as a fourth order high-pass filter, for example, in order to generate the desired envelope curve. Increasing the sampling rate in unit 5 is done as follows. A so-called zero insertion is carried out between each two alternating sampling values. In other words, a zero value is inserted between each two sampling values. This process is repeated in the unit 7, so that three zero values are then inserted between each two alternating sampling values produced by the unit 1. In the spectrum, this unfiltered digital signal, below 32 kHz, has one signal component at 4 kHz and one further signal component at 12 kHz. The following filter 8 filters out the 4 kHz component, so that only the 12 kHz component remains, with a sampling rate of 32 kHz.

Alternatively, the embodiment shown in FIG. 2 may also be used. Then the unfiltered signal at the output of the unit 5 has a sampling rate of 16 khz, and based on the sampling theorem spectral lines are generated at 4 kHz and 12 kHz. This signal is filtered in the unit 8a, which likewise has a transfer function of $(\sin_x)/x$, in such a way that only the 12 kHz component remains. The thus-obtained signal is then oversampled as described above, so that a sine wave signal having a frequency of 12 kHz and a sampling rate of 32 kHz is available at the output of the terminal 9.

Two embodiments for generating a 16 and a 12 kHz charge signal are described in detail below, in conjunction with FIGS. 3–8.

Figure 3:
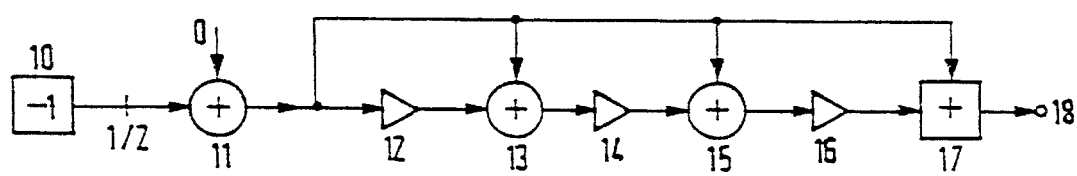
FIG. 3 is a schematic circuit diagram of an embodiment of a configuration for generating signal pulses at a first sampling rate.

FIG. 3 shows the unit 1 of FIG. 1 for generating sampling values of constant amplitude. The unit is constructed in such a way that the amplitude is adjustable to a desired value through coefficients 12, 14, 16. Reference numeral 10 indicates a unit that outputs a constant having the value −1. That value is then shifted one bit to the right, or in other words divided by 2 and delivered to a first input of a first unsaturated adder stage 11. A second input of the adder stage 11 is acted upon constantly by a digital value zero. On one hand, an output of the adder stage 11 is multiplied by the coefficient 12 and delivered to a first input of a second unsaturated adder stage 13. On the other hand, the output of the adder stage 11 is delivered to a second input of the adder stage 13, to a second input of a third unsaturated adder stage 15 and to a second input of a saturated adder stage 17. An output of the second adder stage 13 is multiplied by the coefficient 14 and delivered to a first input of the adder stage 15. An output signal of the adder stage 15 is multiplied by the coefficient 16 and delivered to a first input of the adder stage 17. An output of the adder stage 17 is connected to a connecting terminal 18, at which the digital sampling values can be picked up with a predetermined amplitude.

Figure 4:
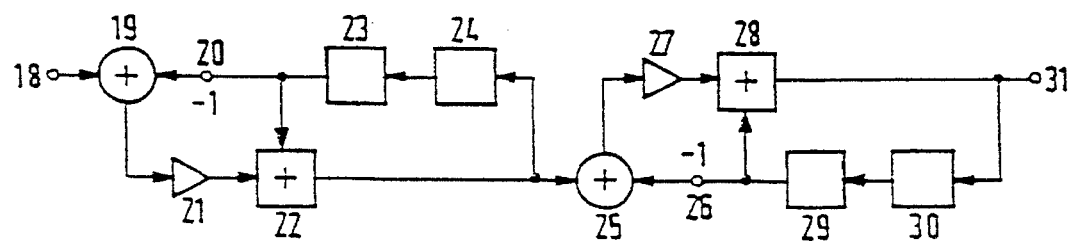
FIG. 4 is a schematic circuit diagram of an embodiment of a digital filter for generating an envelope curve.

The adders 11, 13, 15 are, for example, constructed as simple unsaturated adder stages, at which output values between ±2 can be picked up. Such a configuration with fixed decimal arithmetic can be achieved especially easily by using signal processors. FIG. 4 shows one possible way of achieving a digital low pass for filtering the digital signals present at the connecting terminal 18. The connecting terminal 18 is connected to a first input of an unsaturated adder stage 19. An output signal of the adder stage 19 is multiplied by a coefficient 21 and delivered to a first input of a saturated adder stage 22. An output of the adder stage 22 is connected both to a first input of an unsaturated adder stage 25 and to an input of a delay member 24, such as a memory. An output of the delay member 24 is interconnected with an input of a further delay member 23. An output of the delay member 23 is connected to a second input of the adder stage 22. An output signal of the delay member 23 is also multiplied by −1 in a unit 20 and delivered to a second input of the adder stage 19. An output signal of the adder stage 25 is multiplied by a coefficient 27 and delivered to a first input of a saturated adder stage 28. An output of the adder stage 28 is connected to a connecting terminal 31 and to an input of a delay unit 30, such as a memory. An output of the delay unit 30 is connected to an input of a further delay unit 29. An output signal of the delay unit 29 is delivered to a second input of the adder stage 28 and it is delivered through a unit 26, wherein it is multiplied by −1, to a second input of the adder stage 25.

Figure 5:
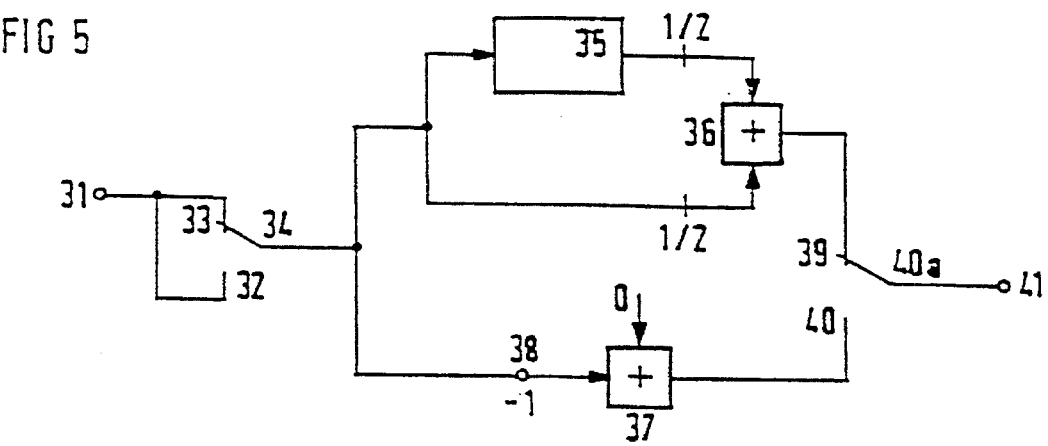
FIG. 5 is a schematic diagram of a circuit configuration for doubling the sampling rate, and a following filter with a further doubling of the sampling rate.

A scanning rate increase is effected in FIG. 5, through a reversing switch having reversing switch contacts 32, 33, 34. The digital signal that can be picked up at the connecting terminal 31 is delivered to both of the reversing switch contacts 32, 33. The middle contact 34 changes between the reversing switch contacts 32 and 33 at twice the sampling rate, for instance 16 kHz in the case described above, and thus doubles the sampling pulses. A further doubling and filtration are then combined in the next circuit unit. To that end, a digital filter 35–38 is split into two signal paths and is sampled by a further reversing switch having reversing switch contacts 39, 40, 40a at a likewise doubled sampling frequency of 32 kHz, for example, and delivered to a connecting terminal 41.

The layout of the filter is as follows. The digital signal that can be picked up at the middle contact 34 is delivered not only to a delay unit 35 but also to a first input of a saturated adder 36, after being divided by 2. This signal is also multiplied by −1 by a unit 38 and delivered to a first input of a further saturated adder 37. A second input of the adder 36 is acted upon by an output signal of the delay member 35, which signal has likewise been shifted one bit to the right. A second input of the adder stage 37 is acted upon by a constant of zero. Outputs of the adder stages 36 and 37 are each supplied to a respective one of the reversing switch contacts 39 and 40.

A transfer function of the filter described in conjunction with FIG. 5 has a (sin$_x$)/x characteristic. The transfer function is selected in such a way that all of the components except for the 16 kHz component of the output signal are filtered out at the reversing switch contact 34. At the same time, the sampling rate is raised to 32 kHz by means of the reversing switch having the contacts 39, 40, 40a.

Figure 6:
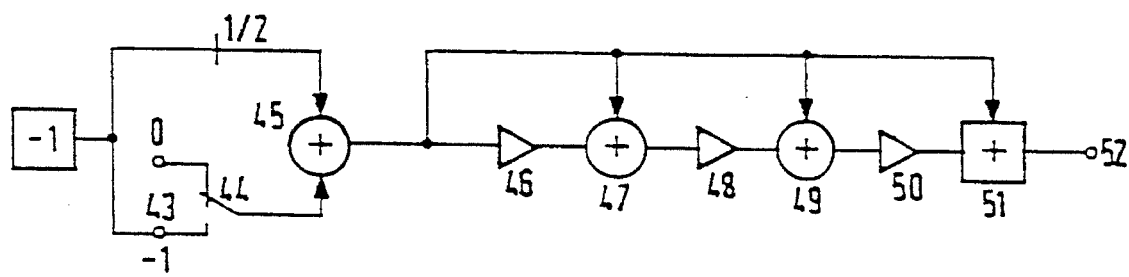
FIG. 6 is a schematic diagram of a further embodiment of a circuit configuration for generating sampling rates of alternating sign.
Figure 8:
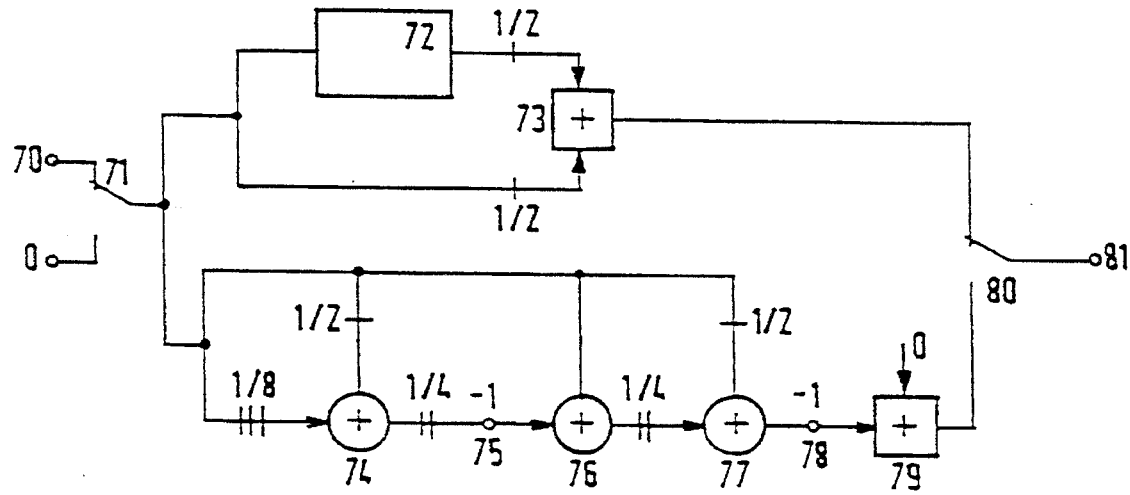
FIG. 8 is a schematic diagram of a further circuit configuration for doubling the sampling rate, with a following filter and a further doubling of the sampling rate.
Figure 7:
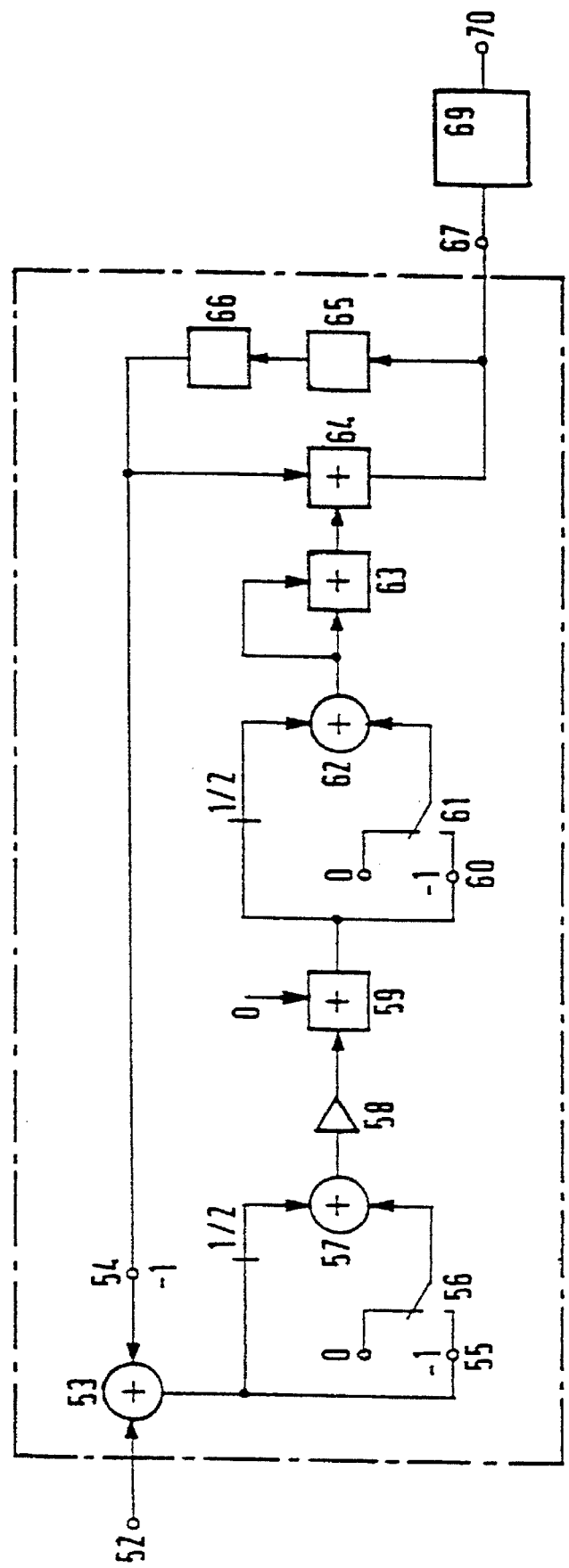
FIG. 7 is a schematic circuit diagram of a further embodiment of a filter for generating an envelope curve.

FIGS. 6–8 show a corresponding embodiment for generating a 12 kHz sine wave signal.

In FIG. 6, sampling values for a sine wave signal with a frequency of 4 kHz and an adjustable amplitude are generated at a sampling rate of 8 kHz. Reference numeral 42 again indicates a unit that outputs a constant having a value −1. On one hand, this value is divided by 2 and delivered to a first input of an adder stage 45, and on the other hand, this value is delivered through a multiplication unit 43 that multiplies this value by −1 and then to a first reversing switch contact of a reversing switch 44. A second reversing switch contact of the reversing switch 44 is acted upon constantly by the digital value of zero. A middle contact of the reversing switch 44 is delivered to a second input of the adder stage 45. An output signal of the adder stage 45 on one hand is multiplied by a coefficient 46 and delivered to a first input of an adder stage 47 and on the other hand is delivered to second inputs of the adder stage 47, an adder stage 49, and a saturated adder stage 51. An output signal of the adder stage 47 is multiplied by a coefficient 48 and delivered to a first input of the adder stage 49. An output signal of the adder stage 49 is multiplied by a coefficient 50 and delivered to a first input of the saturated adder stage 51. An output signal of the saturated adder stage 51 can be picked up at a connecting terminal 52.

In FIG. 7, the digital signal delivered to the connecting terminal 52 is delivered to a first input of an adder stage 53. An output signal of the adder stage 53 is shifted one bit to the right and delivered to a first input of an adder stage 57 and is also multiplied by −1 in a unit 55 and delivered to a first reversing switch contact of a reversing switch 56. A second reversing switch contact is acted upon constantly by the digital value of zero. A middle contact of the reversing switch 56 is interconnected with a second input of the adder stage 57. An output signal of the adder stage 57 is multiplied by a coefficient 58 and delivered to a first input of a saturated adder stage 59. A second input of the saturated adder stage 59 is acted upon by the constant digital value of zero. An output signal of the saturated adder stage 59 on one hand is divided by 2 and delivered to a first input of an unsaturated adder stage 62 and on the other hand is multiplied by −1 in a unit 60 and delivered to a first reversing switch contact of a reversing switch 61. A second reversing switch contact of the reversing switch 61 is acted upon by the digital value of zero. A middle contact of the reversing switch 61 is connected to a second input of the adder stage 62. An output signal of the adder stage 62 is delivered to both first and second inputs of a saturated adder stage 63. An output of the adder stage 63 is connected to a first input of an adder stage 64. An output of the adder stage 64 is connected both to a connecting terminal 67 and to a delay member 65. An output of the delay member 65 is connected to an input of a further delay member 66. An output signal present at an output of the delay member 66 on one hand is delivered to a second input of the adder stage 64 and on the other hand is delivered through a unit 54, wherein it is multiplied by the value −1, to a second input of the adder stage 53. Therefore, the unit 53–66 forms a first stage 68 of a high-pass filter. Reference numeral 69 indicates a second stage, which is of the same construction as the first stage 68, which has an input that is connected to the connecting terminal 67 and which has an output that is connected to a connecting terminal 70.

A unit for increasing the sampling rate and ensuing filtration which is shown in FIG. 8, is similar to the unit 8a of FIG. 2. The signal delivered to the connecting terminal 70 is delivered to a first terminal of a reversing switch 71. A second terminal of the reversing switch 71 is acted upon by the constant digital value of zero. An output signal at a middle contact of the reversing switch 71 on one hand is delivered to a delay member 72 and on the other hand is shifted one bit to the right and delivered to a first input of a saturated adder stage 73. An output signal of the time delay element 72 is likewise shifted one bit to the right and delivered to a second input of the adder stage 73. The output signal at the middle contact of the reversing switch 71 is also shifted three bits to the right and delivered to a first input of an unsaturated adder stage 74. The output signal present at the middle contact of the reversing switch 71 is moreover shifted by one bit to the right and delivered to a second input of the adder stage 74 and directly to a second input of an unsaturated adder stage 76 and is likewise shifted one bit to the right and delivered to a second input of an unsaturated adder stage 77. An output signal of the adder stage 74 is shifted two bits to the right and multiplied by −1 in a unit 75 and is delivered to a first input of the adder stage 76. An output signal of the adder stage 76 is shifted 2 bits to the right and delivered to a first input of the adder stage 77. An output signal of the adder stage 77 is multiplied by −1 in a unit 78 and is delivered to a first input of a saturated adder stage 79. A second input of the adder stage 79 is acted upon by the digital constant value of zero. An output signal of the adder stage 79 is delivered to a second reversing switch contact of a reversing switch 80. A first reversing switch contact of the reversing switch 80 is connected to the saturated adder stage 73. A middle contact of the reversing switch 80 is connected to a connecting terminal 81, at which an output signal of the entire configuration can be picked up.

In the example shown, alternating sampling values are generated having a sampling frequency of 8 kHz with the configuration 42–52. The amplitude of the thus-generated digital sine wave signal can be varied through the other coefficients 46, 48 and 50. The configuration of FIG. 6 represents a high-pass filter, which assures the desired transient response behavior of the digitally generated charge pulses. Through the use of the reversing switch 71, which is clocked at 16 kHz, a zero insertion of the previously generated alternating digital sampling values then takes place. The ensuing re-increase to the sampling rate of 32 kHz is effected, as in the previous example, by dividing the following filter having the $(\sin_x)/x$ transfer function into two signal paths, so that the two signal paths can be sampled in alternation by the reversing switch 80 at a sampling frequency of 32 kHz, and the digitally generated sine wave signal can be picked up at the sampling frequency of 32 kHz at the connecting terminal 81.

The configurations shown in FIGS. 2–4 and 5–7, respectively, can be achieved in particular with a digital signal processor that operates with fixed decimal arithmetic, for instance. However, a suitably dimensioned hard-wired circuit configuration is equally possible.

The exemplary embodiments of FIGS. 3–7 have no limit cycles, so that if digital zero values are input, then digital zero values appear at the output as well.

Due to the recursion of the fourth-order filters, the resultant transient-response and attenuation behavior of the charge pulses is very gentle.

The number of doubling stages for the sampling rate should be adapted to the particular sampling rate to be generated and to the output sampling rate. The two exemplary embodiments described above represent preferred embodiments. Naturally, other frequencies can be generated by the method. However, the signal frequency to be generated is dependent on the sampling rate.

A further increase in the sampling rate can be achieved by oversampling of the digital signal produced by the method.

I claim:

1. A method for generating a digital sine wave signal having a predetermined sampling rate, which comprises:
   a) generating a pulse train at a sampling frequency having a predetermined sampling rate frequency divided by $2^n$;
   b) generating an envelope curve;
   c) doubling the sampling rate;
   d) repeating the doubling of the sampling rate until generation of a desired sine wave signal in an unfiltered spectrum of the generated signal;
   e) filtering out undesired frequency components; and
   f) optionally re-increasing the sampling rate by oversampling a previously generated signal.

2. The method according to claim 1, which comprises generating the pulse train with an alternating amplitude sign.

3. The method according to claim 1, which comprises generating the pulse train with a constant amplitude sign.

4. The method according to claim 2, which comprises doubling the sampling rate by zero insertion.

5. The method according to claim 3, which comprises doubling the sampling rate by doubling a sampling value.

6. The method according to claim 1, which comprises generating the envelope curve with a filter.

7. A circuit configuration for generating a digital sine wave signal having a predetermined sampling rate, comprising:
   a unit for generating digital sampling values;
   a filter for generating an envelope curve, being connected downstream of said unit for generating digital sampling values;
   units for raising a sampling frequency, being connected downstream of said filter for generating an envelope curve; and
   a digital filter for filtering the generated digital sampling values.

8. The circuit according to claim 7, including a last unit for doubling the sampling rate being combined into one unit with said digital filter, said digital filter being split into two signal paths, and said two signal paths being sampled in alternation by a reversing switch at twice the sampling frequency of said digital filter.

* * * * *